Dec. 14, 1948.  F. W. MEREDITH  2,455,939
DEVICE FOR DETECTING TURNS OR MEASURING RATE OF TURNS
Filed Sept. 27, 1943  5 Sheets-Sheet 1
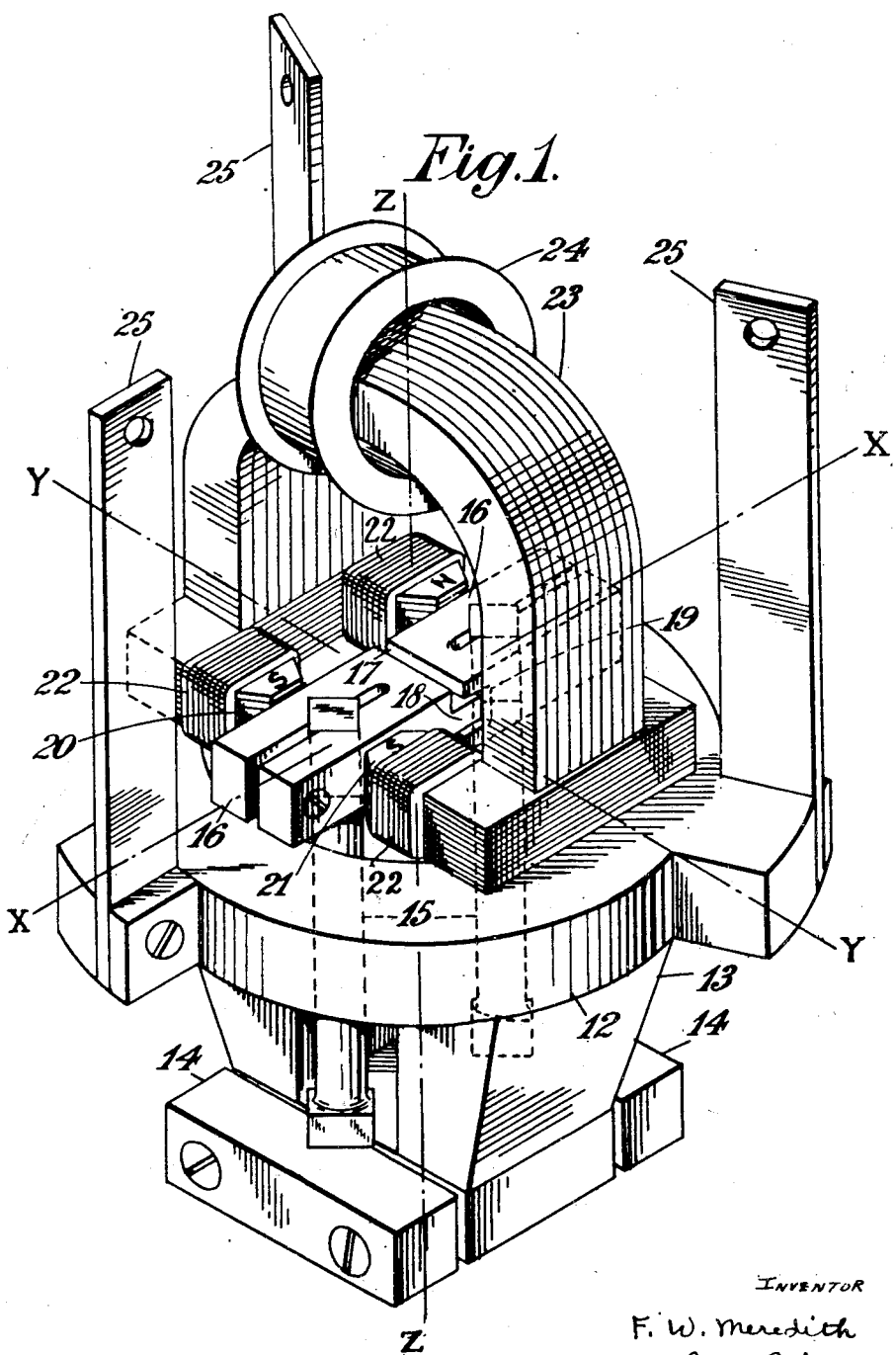
INVENTOR
F. W. Meredith
By Watson, Cole, Grindle &
Watson  ATTYS Dec. 14, 1948.  F. W. MEREDITH  2,455,939
DEVICE FOR DETECTING TURNS OR MEASURING RATE OF TURNS
Filed Sept. 27, 1943  5 Sheets-Sheet 2

Inventor:
F. W. MEREDITH,
By Watson, Cole, Grindle & Watson
Attorneys

PIEZOELECTRIC ELEMENTS

Dec. 14, 1948.  F. W. MEREDITH  2,455,939
DEVICE FOR DETECTING TURNS OR MEASURING RATE OF TURNS
Filed Sept. 27, 1943  5 Sheets-Sheet 4

Inventor:
F. W. MEREDITH,
By Watson, Cole, Grindle & Watson
Attorneys

Dec. 14, 1948.   F. W. MEREDITH   2,455,939
DEVICE FOR DETECTING TURNS OR MEASURING RATE OF TURNS
Filed Sept. 27, 1943   5 Sheets-Sheet 5

INVENTOR
F. W. Meredith
By Watson, Cole, Grindle & Watson
ATTYS

Patented Dec. 14, 1948

2,455,939

UNITED STATES PATENT OFFICE 2,455,939

DEVICE FOR DETECTING TURN OR MEASURING RATE OF TURN

Frederick William Meredith, London, England, assignor to S. Smith & Sons (England) Limited, a British company Application September 27, 1943, Serial No. 504,072
In Great Britain July 27, 1942

11 Claims. (Cl. 33—204)

1

This application corresponds to the applications of S. Smith & Sons (Motor Accessories) Limited and Frederick William Meredith, Serial No. 10,512/42, which was filed in Great Britain on July 27, 1942; Serial No. 12,539/42, which was filed in Great Britain on September 4, 1942, and Serial No. 3,922/43, which was filed in Great Britain on March 10, 1943.

This invention consists of improvements in or relating to devices for detecting turn or measuring rate of turn and although the invention is of general application it relates particularly to instruments for use on moving craft such as ships or aeroplanes.

In the past, rate of turn has been measured by an instrument known as a gyroscope, which consists essentially of a wheel rotating at high speed in gimbals. The disadvantages of such an instrument are well known. They include all the disadvantages associated with high-speed bearings and with gimbals, the difficulties of ensuring accurate dynamic balance of the wheel about its axis of rotation and the difficulty of transmitting a signal which is in the form of a steady displacement.

The object of the present invention is to provide an alternative to a gyroscope for measuring rate of turn, but one which does not suffer from the disadvantages mentioned above.

The basis of the invention is that the mass instead of being rotated about an axis about which it is dynamically balanced, as in the case of the gyroscope, is caused to oscillate. The necessity for bearings and dynamic balancing is thus avoided, while at the same time a signal in the form of an oscillatory displacement or force is obtainable and can thus be readily transmitted electrically.

For convenience of reference in describing the motion of the oscillatory mass, in this specification and in the appended claims the motions of the mass will be referred to three orthogonal axes X, Y and Z fixed in the device, the Z axis being the axis about which the rotation is to be detected or measured.

In its preferred embodiments the invention contemplates the provision of a device for detecting turn or measuring rate of turn comprises a mass mounted for movement in the direction of the X axis, means for forcing an oscillation of said mass in the said direction and means for detecting or measuring the oscillatory disturbance of said mass consequent on a turn of said device about the Z axis, whereby the change in the periodic force along the Y axis (at the frequency

2 of the oscillation along the X axis) and consequently a turn is detected or the rate of turn of said device measured.

In carrying out the purposes of the invention, provision is made for maintaining the oscillation of the mass in the direction of the X axis at a predetermined frequency, the direction of the forced oscillation of the mass being made to follow the rotation of the X axis around the Z axis about which the turn is to be detected or the rate of turn measured.

According to one embodiment of the invention the mass may be mounted free to oscillate in the direction of the Y axis against a resilient restraint, and the means for detecting or measuring the force due to a component of the rate of turn is made to measure or detect the oscillations in the direction of the Y axis.

In accordance with other embodiments of the invention, electrical means such as a pick-up device may be arranged to restrain, at least in part, the oscillations in the direction of the Y axis so that its electrical output becomes a measure of the rate of turn.

Preferably the objects of the invention may be achieved by applying a periodic force in the direction of the Y axis opposing the vibration in this direction. Consequently according to yet another feature of the present invention the mass is mounted to oscillate both in the direction of the X axis and in the direction of the Y axis, and there are provided means for forcing an oscillation in the direction of the X axis, means for detecting or measuring the force due to a turn forcing an oscillation of the mass in the direction of the Y axis, and driving means for applying a force to oppose and therefore damp oscillations in the direction of the Y axis. This is a particularly useful feature as by making the opposing force proportional to the velocities of the oscillations in the direction of the Y axis the detecting or measuring means may detect or measure the force due to a turn.

The transverse driving force in the direction of the Y axis is a measure of the rate of turn and is used for giving an indication or exerting a control in accordance with the rate of turn. Thus where the transverse force is obtained from an electromagnet, the energising current or a current derived therefrom is used to give the indication or exert the control. This current may conveniently be obtained from a detector or pick-up generating a voltage proportional to the transverse vibrations (in the direction of the Y axis) and passing these through an amplifier.

Other objects and features of novelty, including certain important refinements of the invention, such as the various adjustments looking toward maintaining the running of the vibratory mass along a principal axis, will be apparent from the following specification when read in connection with the accompanying drawings in which certain embodiments of the invention are illustrated by way of example.

Figure 1 illustrates diagrammatically in perspective one device for detecting turn or measuring rate of turn;

Figure 5B:
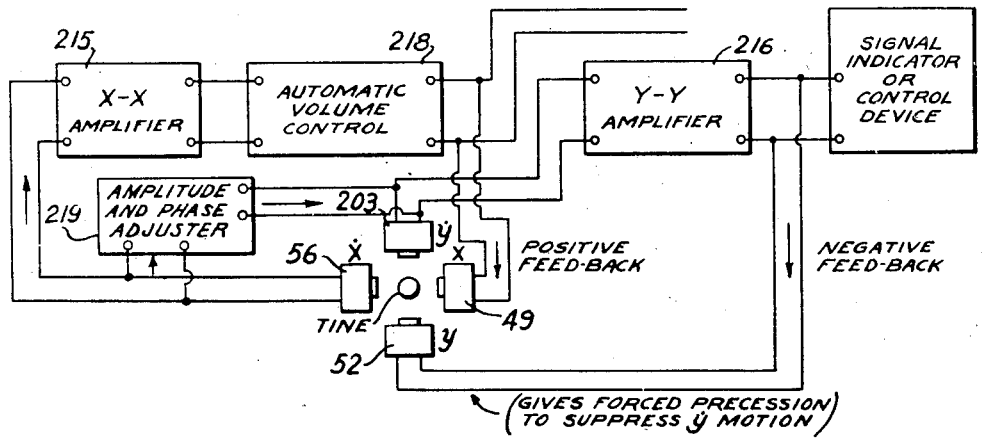
Figure 5 is a central sectional elevation of another construction.
Figure 7A:
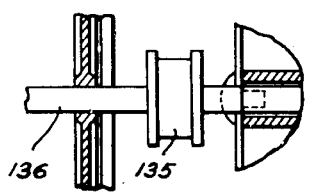
Figure 5:
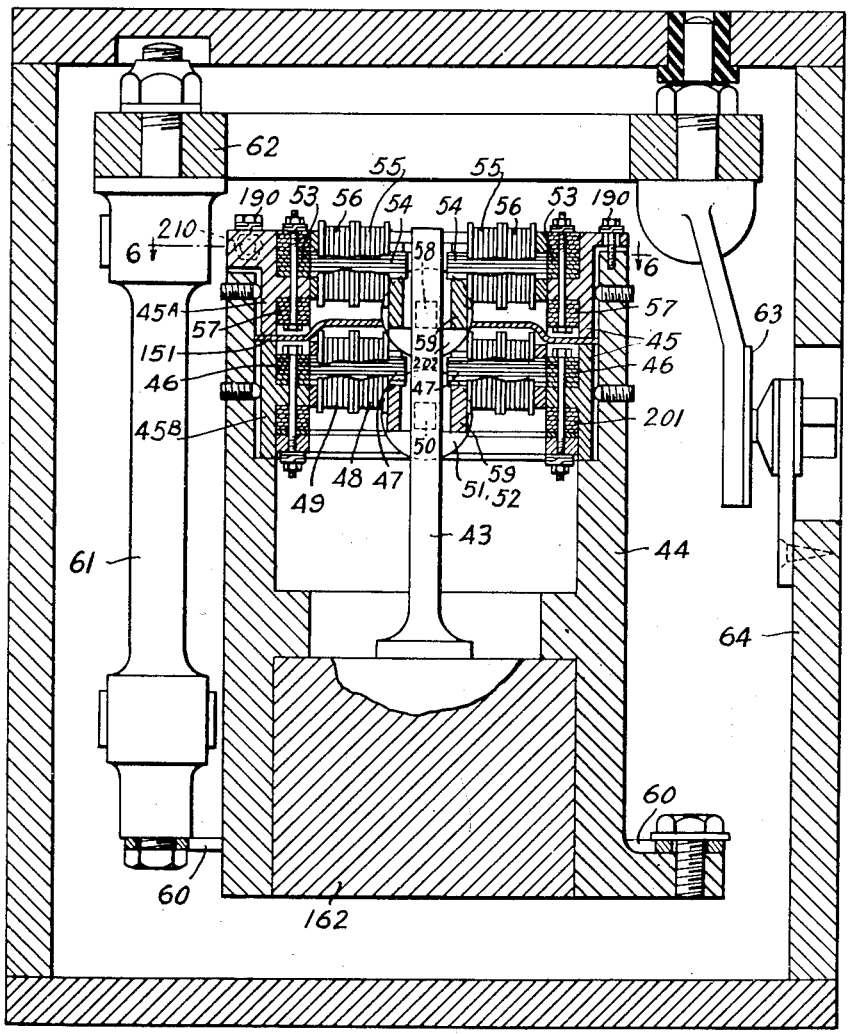
Figure 6:
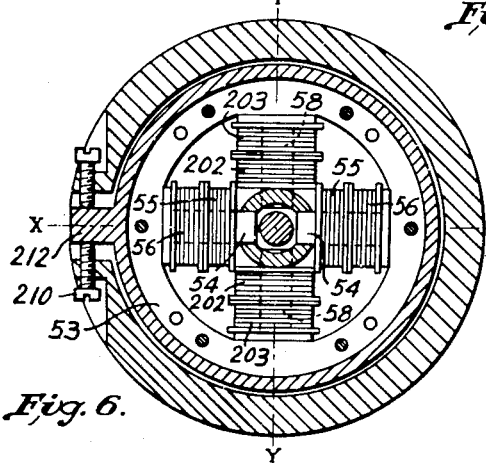
Figure 5A:
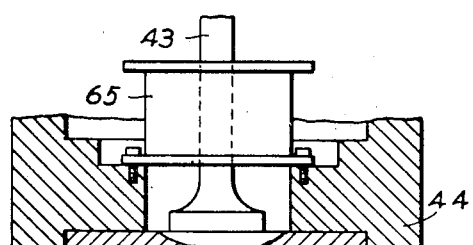
Figure 7:
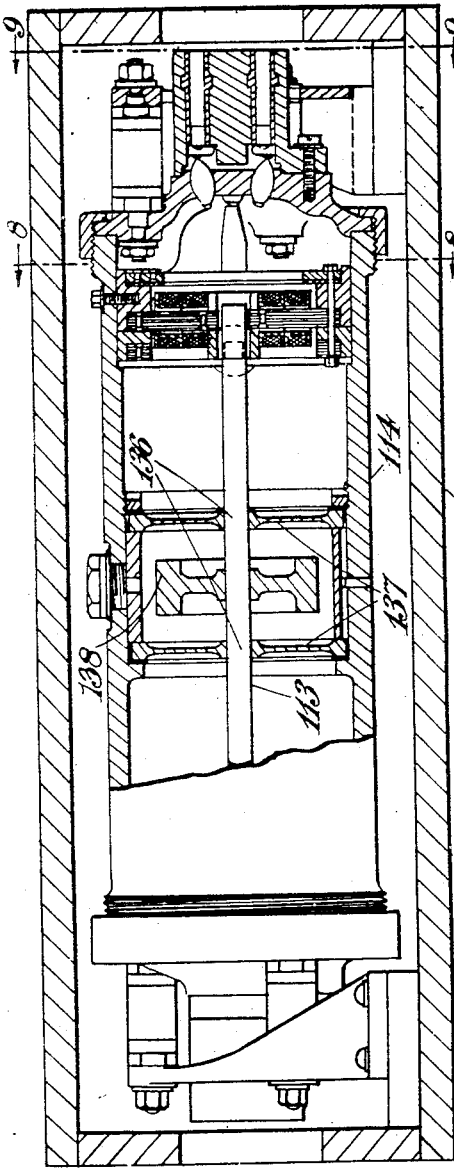

Figure 5A is a fragmentary view similar to the central portion of Figure 5 and showing a modified construction in which a single D. C. current is employed to replace the multiple D. C. coils used in the embodiment shown in Figure 5;

Figure 5B is a wiring diagram showing the driving and control connections for the rate of turn device illustrated in Figures 5 and 6 of the drawings;

Figure 6 is a partial plan on the line 6—6 of Figure 5;

Figure 7 is a central sectional elevation (partly in elevation) of another construction;

Figure 7A is a fragmentary view in vertical section showing a portion of the tine 136 of Figure 7 with an alternative D. C. coil applied thereto.

Figure 8:
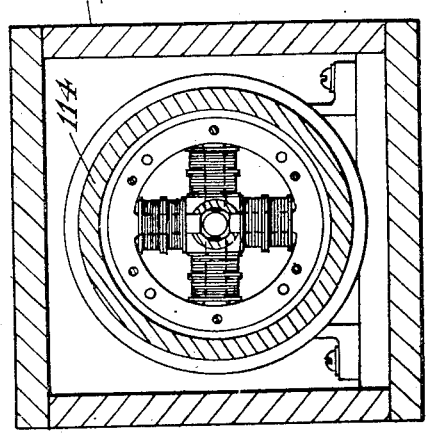

Figure 8 is a transverse section on the line 8—8 of Figure 7, and

Figure 9:
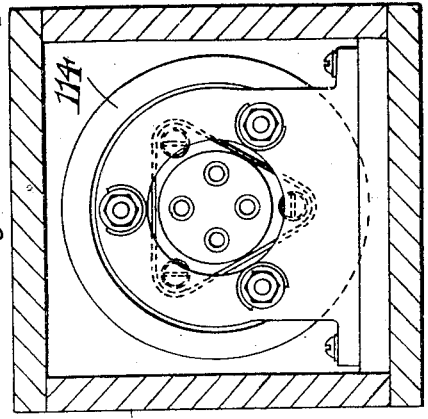

Figure 9 is a transverse section on the line 9—9 of Figure 7.

Referring first to Figure 1, a main frame is shown having an annular body 12 and a substantially pyramidal lower part 13 to which are firmly held and clamped by clamping plates 14 two metal bars 15 forming a "tuning fork." These metal bars 15 may be cylindrical rods with rectangular terminal pieces to facilitate accurate clamping.

To the top end of each bar 15 is clamped a mass 16 of iron or other magnetic material. These two masses 16 are separated by an air gap 17 and in order that part of the air gap may remain substantially uniform, a tongue 18 on one of the members 16 projects within a groove 19 on the other member 16.

Disposed on the top of the annular part 12 of the frame are two horseshoe electromagnets 20 and 21 with their like poles arranged opposite each other, as shown at N—N and S—S. On the arms of the horseshoes are conducting coils 22 energised both with D. C. from a suitable source and with A. C., the period of which is controlled (see Figure 1A) from the vibrations of the tuning fork so that its periodicity is the same as the natural period of the tuning fork. The reason for using pulsating current as distinct from alternating current alone is to avoid "frequency doubling." It will be realized that with the application of alternating current alone there would be two peaks or points of saturation of the magnet during each cycle. By applying the proper combination of D. C. and A. C. current, a pulsating, rather than an alternating, effect is obtained, and the device is thus polarized yielding but one peak or saturation per cycle and of the same polarity.

The voltages applied to the coils 22 are also controlled so that the amplitude of oscillation in the direction of the X axis remains constant. The method of exercising a control of this kind is well known in connection with the automatic volume control of radio receivers. Such automatic volume controls are exemplified by the devices shown in United States patents to Neustadt 2,239,906 and Travis 2,253,450.

Figure 1A:
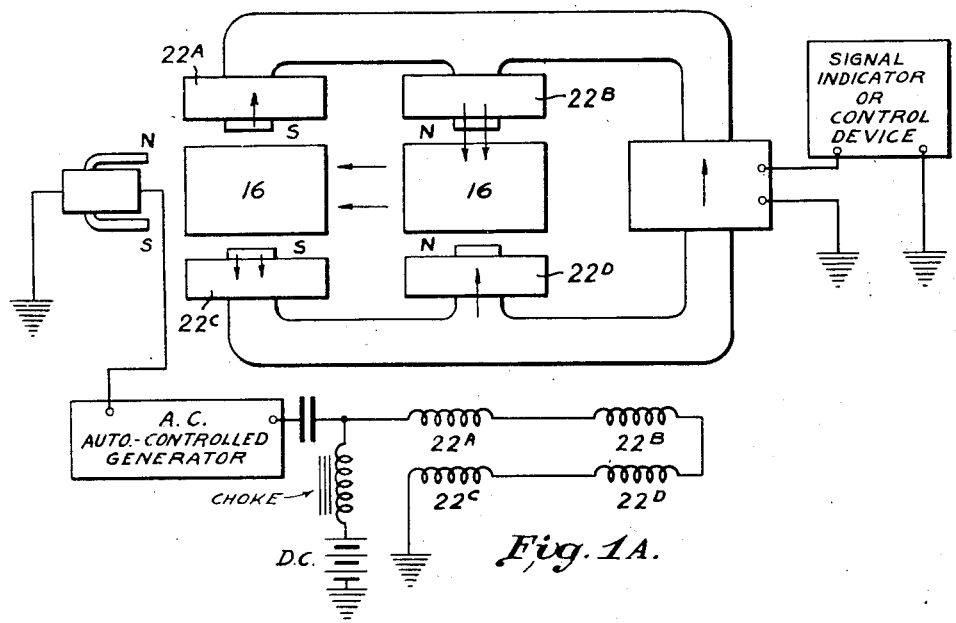
Figure 1A is a wiring diagram showing the electrical connections employed in driving the vibratory masses shown in Figure 1.

As shown in Figure 1A of the drawings the coils 22a, 22b, 22c, and 22d are energized by a pulsating current from both A. C. and D. C. sources, the source of A. C. being automatically controlled in accordance with the natural period of vibration of the masses 16. This is effected through the magnet and coil 116. By this means frequency doubling is eliminated, there being but one maximum per cycle as compared with two maxima if an alternating current alone were used.

A small air gap of suitable width is allowed between the magnet poles and the oscillating masses 16 which lie between them. The two horseshoe cores 20, 21 are joined together by a U-shaped bridge 23 of magnetic material which carries a pick-off coil 24. The assembly may be suspended on springs 25 with frequencies far removed from that of the tuning fork so as to provide an anti-vibration mounting.

The operation of the device is as follows:—
Normally when the device is not turning, the magnetic flux from each horseshoe flows from the north pole through the adjacent mass 16 across the air gap 17 to the other mass 16 and thence to the south pole of the same horseshoe. Thus the masses 16 oscillate to and from one another (in the direction of the X axis) at a frequency equal to that of the pulsating current, the path of oscillation being in the plane containing the axes of the two rods 15. At this stage no flux flows through the bridge 23 and hence no current is induced in the pick-off coil 24.

When the assembly turns about the Z axis which is parallel to the rods 15, the only direction in which damping of the oscillations of the two tines is in effect eliminated is the direction of the X axis because of the drive. Consequently if rotation of the assembly and therefore of the X axis, takes place about the Z axis, the direction of the oscillations will follow the rotation of the X axis, as oscillations in any other direction will be damped and die down rapidly when rotation ceases. During a turn therefore there is a periodic force acting on the bodies 16 and tines 15 forcing them to follow the rotation of the X axis. This force is proportional to the rate of turn, and will force an oscillation of the bodies 16 and tines 15 in the direction of the Y axis. Owing to the damping in the direction of the Y axis, the amplitude of these oscillations will very rapidly build up to a value proportional to the force and therefore to the rate of turn. The oscillations in the direction of the Y axis are such that while one body 16 approaches a pole of horseshoe 21 the other body 16 approaches a pole of the other horseshoe 20. It will now be seen that some flux flows from the north pole of horseshoe electromagnet 20 through both oscillating bodies to the south pole of horseshoe 21 and back through the bridge 23. The result is to set up in the pick-up coil 24 an induced current which is a measure of the rate of turn since the coil has induced in it an alternating voltage of frequency equal to that of the forced oscillations and of an amplitude proportional to that of the oscillations in the direction of the Y axis.

This current can be used to operate an indicator of rate of turn or to operate control apparatus, say on an aircraft.

In the example just described the oscillating masses were held on the free ends of a tuning fork but it will be understood that there are many other arrangements in which masses of suitable inertia can be caused to oscillate along a predetermined path.

Figure 2:
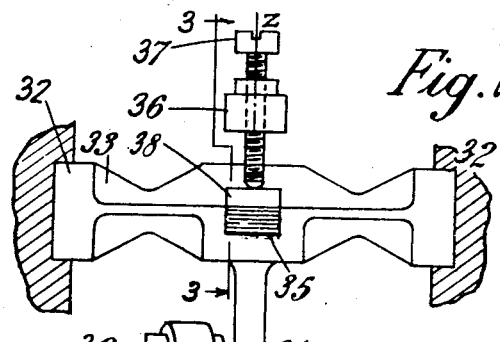
Figures 2, 3 and 4 illustrate diagrammatically another form of the invention, Figure 2 being a side elevation, Figure 3 a sectional view at right-angles to Figure 2 with a part of the apparatus omitted for clearness, and Figure 4 showing a driving circuit.
Figure 3:
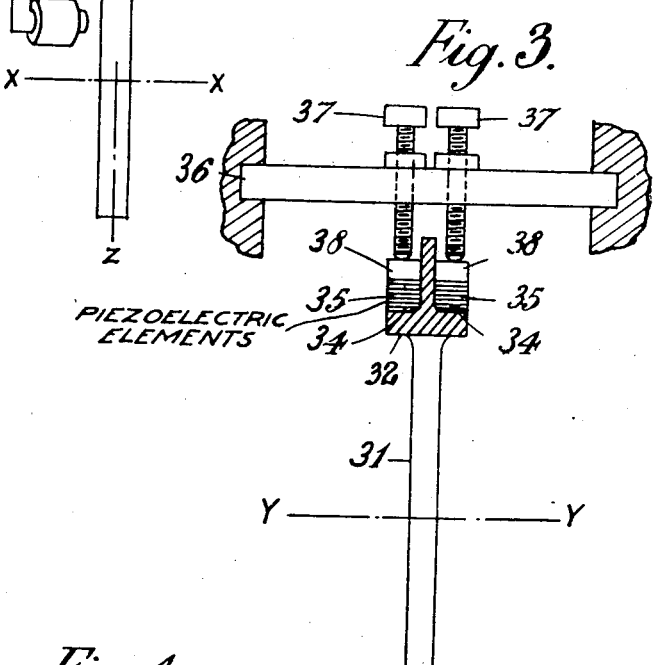
Figure 4:
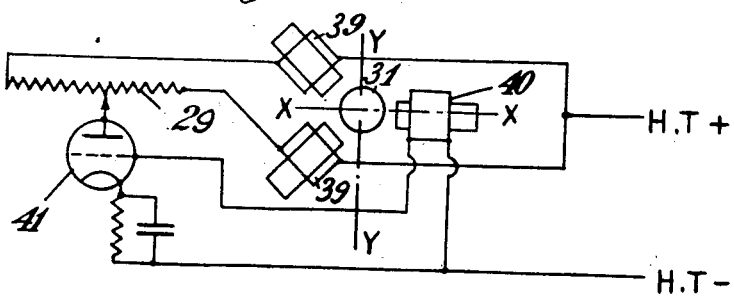

Referring to the form of the invention shown in Figures 2, 3 and 4, the oscillatory member and its mounting is of steel monobloc construction and comprises a flexible tine 31 and a cross member 32. The cross member is rigid to bending stress but is given a certain amount of torsional resilience by making parts 33 of cruciform section. The cross member is also formed with two beds 34 in which are arranged two suitably-cut crystals 35. These crystals are oppositely electrically connected in series to output terminals (not shown). The tine 31 is accurately ground to the form of a cylinder.

A transverse bar 36 having a certain amount of resilience is mounted above the cross member 32, 33 and at right-angles thereto. Passing through the bar 36 are two adjustable screws 37 engaging pressure plates 38 which bear on the crystals 35 and which can be adjusted to apply a datum load to the crystals. The cross member 32, 33 and the transverse bar 36 are preferably mounted on a rigid annular base which forms a cylindrical enclosure for the tine and its mounting. The tine can vibrate either (in the direction of the X axis) in the plane of the paper (Figure 2) or (in the direction of the Y axis) in a plane at right-angles thereto. It is, however, permitted to vibrate in the latter plane not only by virtue of the resilience of the tine, but also by virtue of the torsional resilience of the cross member 32, 33, and the resilience in double flexure of the transverse bar 36. Hence its natural frequency of vibration in this latter plane (the ZY plane) is less than in the former (the ZX plane) and will for convenience be referred to as the "cross frequency." The natural frequency in the ZX plane, the plane of the paper (Figure 2), will be referred to as the "basic frequency."

The tine 31 is driven by an electromagnetic circuit shown diagrammatically in Figure 4. As there shown the tine 31 is surrounded by three electromagnets, including two driving magnets 39 and one generating magnet 40. The two driving magnets 39 are energised by the current flow through a thermionic valve 41, the current being divided between the two magnets by means of a potentiometer 29. The grid of the valve is controlled by impulses from the magnet 40 so that the tine is driven at its natural frequency.

In operation the tine 31 is driven by the circuit shown in Figure 4 so that it vibrates (in the direction of the X axis) in the plane of the paper (Figure 2) when it is not subjected to rotation. Any tendency to vibrate out of this plane is initially corrected by adjustment of the potentiometer 42.

When the device is not subjected to rotation, the tine 31 vibrates only in the plane of the paper (Figure 2) and there is no voltage at the output terminals. If, however, the device is rotated about the axis of the tine 31 a cross force will be set up tending to produce a cross vibration (in the direction of the Y axis). This force will have an amplitude proportional to the rate of turn and a frequency equal to the basic frequency. Hence the tine will be forced to vibrate in a plane at right-angles to the plane of the paper (Figure 2) at the basic frequency. These forced vibrations will set up an alternating voltage at the output terminals of basic frequency and of amplitude proportional to the rate of turn.

The output terminals may be connected to a suitable voltmeter for indicating rate of turn, or the output voltage may be used to exert a control. Alternatively the output terminals may be connected to an integrating wattmeter to show the angle of turn or the number of revolutions. For example the device may be used to measure the rate of yaw of an aircraft and the output voltage may control the rudder or aileron movement to maintain the craft on course.

The device is mounted on anti-vibration mountings to avoid loss of energy from the tine and to avoid the transmission of shock to the tine. If, however, the tine is set in cross vibration by shock excitation it will vibrate at the cross frequency and the signal or voltage at the output terminals will be of cross frequency. The indicator or control may be made insensitive to this frequency. To separate wanted signals at the basic frequency from all unwanted signals, the signals are applied to filter circuits which only pass signals of the basic frequency. The sign of the rate of turn is determined by comparing the signal with a signal of the basic frequency controlled by the thermionic valve driving the tine.

Referring to Figures 5 and 6, on a first base 162 is mounted a tine 43 and surrounding the base 42 and the tine 43 is a cylindrical sleeve 44 carrying a cylindrical steel holder 45 in two coaxial parts 45A and 45B separated by a "Mu-metal" screen 151. The main drive of the tine 43 is magnetic and comprises an annular laminated iron core 46 with diametrically-opposite poles 47 each carrying a D. C. coil 48 and an A. C. coil 49. This drive causes the tine 43 to vibrate in the plane of the paper (Figure 5) or along the axis X—X in Figure 6.

The transverse (damping) drive of the tine is also magnetic and has two opposite poles 50 projecting from an annular core 201, each carrying a D. C. coil 51 and an A. C. coil 52. This damping drive has effect along the axis Y—Y in Figure 6.

A generating unit (for generating the control voltages for the main and transverse drives above described) is constructed in the same way as these main and transverse drives. Thus the generator for the main drive comprises an annular core 53 with diametrically-opposite poles 54 each carrying a D. C. coil 55 and an A. C. coil 56; this voltage generator takes effect along the axis X—X of Figure 6. The transverse voltage generator along the line Y—Y of Figure 6 also comprises an annular core 57 and two opposite poles 58 each carrying a D. C. coil 202 and an A. C. coil 203. Each of the units has a brass shading ring 59 which supports the poles and serves to block the A. C. flux along the tine. A fine angular adjustment comprising the screws 210 and the projecting lug 212 is provided so that the units 45A and 45B may be rotatably adjusted in relation to one another within the sleeve 44. Set screws 190 threaded into the walls of the cylinder 44 pass through enlarged openings in the peripheral flange of the unit 45A and serve to secure the unit in the position to which it has been adjusted.

The sleeve 44 is carried on a ring 60 bolted to three rods 61 (of which one is shown). The rods are carried in a ring 62 which is carried on vibration-absorbing discs 63 by a casing 64.

Electrical connections are made to the several coils for flow of current in the manner now to be described. A D. C. current is passed in series through the four D. C. coils of the main driving and transverse (damping) unit, so that flux flows inwards through the poles 47 of the main drive and outwards through the poles 50 of the transverse drive, the flux flowing along the tine 43 and through the cores 46 and 201 and the interposed part of the holder 45. The A. C. driving current for the main drive is passed through the two A. C. coils 49 of the main drive in series so that the flux flows cross the tine 43 from one pole 47 to the other and round the two halves of the core 46. The A. C. flux is prevented from flowing along the tine to the other drive by the shading ring 59. The A. C. driving current for the transverse drive is also passed through the two A. C. coils 52 of the transverse drive in an exactly similar manner.

A D. C. current is passed through the four D. C. coils of the generator unit in a similar manner and the four series-connected coils of the generator unit are connected in parallel with the four series-connected coils of the driving unit 46B across the same D. C. source. The two A. C. coils 66 (denominated $x$ in Figure 5B) of the main generator are connected in series and the voltage generated therein is amplified by a main amplifier, shown at 215 in Figure 5B, and the output current of that amplifier is applied to the two A. C. coils 49 of the main drive (the force of which may be designated by the quantity $X$) to drive the tine in the plane of the paper in Figure 5 or in the plane X—X of Figure 6. Similarly the two A. C. coils 203 (designated $y$ in Figure 5B) of the transverse generator are connected in series and the voltage generated therein is amplified by a transverse amplifier 216 and the output from this transverse amplifier is applied to the two A. C. coils 52 of the transverse drive so that the transverse drive (force $Y$) opposes the transverse vibrations of the tine 43. The output of the transverse amplifier is used to operate an indicator or control 217, for example to effect automatic control on an aircraft as described in United States application Serial No. 519,463, filed January 24, 1944. The main amplifier 215 is provided with delayed automatic volume control 218 to maintain constant input for the purpose of keeping the amplitude of the main vibrations constant. The sense of the turn is manifested by the phase sense of the output at 216 when compared with the input to the X-drive at 49 taken as the reference voltage.

The eight D. C. coils above referred to may be replaced by a single D. C. coil 65, as shown in Figure 5A. Alternatively the D. C. coils may be dispensed with and a permanent magnet used as the tine.

In the modification illustrated in Figures 7, 8 and 9 it is unnecessary to repeat the description of the main and transverse drive or of the generator unit of Figure 5. The object of the modified arrangement is to ensure that the vibrations of the tine itself shall be balanced. For this purpose the tine 113 is supported at its two nodal points 136 by flexible diaphragms 137. A central mass 138 is mounted on the tine to bring the nodal points closer together. The driving unit is now placed at one end of the tine while the generator unit is placed at the other end. Alternatively the main drive and the main generator may be disposed at one end of the tine 113 and the transverse (damping) drive and the transverse generator may be disposed at the other end of the tine 113.

In Figure 7A, the possibility of using D. C. coils around the tine itself is indicated by the coils shown at 135. Figure 8 shows the same arrangement of coils and cores as in Figure 6 and Figure 9 shows the method of mounting the main sleeve 114 in the casing 134.

In both the constructions described it is desirable that the natural damping of the tine should be reduced to a minimum. For this purpose the casings may be sealed and evacuated.

The constructions described above in relation to Figures 5 to 9 have the following advantages:

1. They ensure adequate damping of the transverse vibrations (i. e., the vibrations in the plane Y—Y of Figure 2).

2. Since the transverse generator is used both to control the lateral damping and to detect the turn, they ensure that the signal pick-up cannot be misaligned in relation to the heavily-damped axis.

3. They ensure that the signal level at the output of the transverse amplifier is substantially independent of any variation of the gain of this amplifier.

4. The fact that the natural damping of the tine is reduced to a minimum and the fact that the natural frequency of the tine in the direction of the Y axis coincides with the driving frequency in the direction of the X axis ensures that any stray current of this frequency in the transverse drive (however small) due to a stray signal will build up a finite motion in the direction of the Y axis in virtue of resonance and thus cancel out the stray signal.

If it is found that transverse vibration is taking place when there is no turn and this cannot be eliminated by the above-mentioned fine angular adjustment, then a portion of the output from the main generator may be fed to the transverse generator after suitable adjustment of phase to cancel the signal picked up by the transverse generator when there is no turn. An amplitude and phase adjuster is shown in Figure 5B of the drawings at 219 and is suitably connected to the leads from elements 56 and 203, the direction of feed being indicated by the arrows.

The various embodiments of the invention described herein are well adapted for use in the control of water and aircraft and especially in controlling the latter about the yaw, roll, or pitch axes. In such cases the frequency of the forced oscillation is high compared with the rate of such yaw, roll or pitch. Also, in most applications of the invention the frequency of the forced oscillation of the mass in the direction of the X axis is so high that any component of the force detected or measured in the direction of the Y axis due to acceleration of turn is small compared with that due to rate of turn.

While a number of ways have been described of detecting or measuring the force in the direction of the Y axis due to rotation about the Z axis, many other ways of achieving the same end will occur to those skilled in the art, and it is also understood that numerous other changes may be made in the embodiments illustrated and described herein without departing from the scope of the invention as defined by the following claims.

I claim:
1. A device for measuring rate of turn, the three dimensional orthogonal axes of which are designated X, Y, and Z, the turn taking place about the Z axis, the X and Y axes therefore lying in the plane of the turn to be detected; said device comprising a base, a mass, said mass being resiliently mounted on the base for movement in the direction of the X axis and in the direction of the Y axis, means for forcing an oscillation of the mass in the direction of the X axis, means controlled by oscillation of the mass in the direction of the Y axis for generating an alternating E. M. F. proportional to the velocities of the oscillations in the direction of the Y axis, and driving means controlled by said E. M. F. for applying a force to oppose and therefore damp oscillations in the direction of the Y axis, said E. M. F. being a measure of the rate of turn.

2. A device responsive to rate of turn, the three dimensional orthogonal axes of which are designated X, Y, and Z, the turn taking place about the Z axis, the X and Y axes therefore lying in the plane of the turn to be detected; said device comprising a base, a mass, a resilient connection between said mass and said base, said connection permitting movement of the mass in the direction of the X axis, a driving electromagnet, said electro-magnet being arranged to force an oscillation of the mass in the direction of the X axis, means for controlling the energization of the electromagnet in accordance with the oscillations of the mass in the direction of the X axis, means controlled by oscillations of the mass in the direction of the Y axis for generating an alternating E. M. F. proportional to the velocities of oscillations in the direction of the Y axis and driving means controlled by said E. M. F. for applying a force to oppose and therefore to damp oscillations in the direction of the Y axis, said E. M. F. being a measure of the rate of turn.

3. A device for measuring rate of turn, the three dimensional orthogonal axes of which are designated X, Y, and Z, the turn taking place about the Z axis, the X and Y axes therefore lying in the plane of the turn to be detected; said device comprising a base, a mass, a resilient connection between said mass and said base, said connection permitting movement of the mass in the direction of the X axis and in the direction of the Y axis, means for forcing an oscillation of the mass in the direction of the X axis, and a piezo electric pick up comprising a piezoelectric crystal disposed so as to be intermittently compressed by said mass when oscillating in the direction of the Y axis.

4. A device for measuring rate of turn, the three dimensional orthogonal axes of which are designated X, Y, and Z, the turn taking place about the Z axis, the X and Y axes therefore lying in the plane of the turn to be detected; said device comprising a base, a mass, a resilient connection between said mass and said base, said connection permitting movement of the mass in the direction of the X axis and in the direction of the Y axis, a driving electro-magnet said electro-magnet being arranged to force an oscillation of the mass in the direction of the X axis, a pick up having an output for the E. M. F. generated and arranged to be driven by oscillations of the mass in the direction of the X axis, an electric circuit connection between the output of the pick up and the input of the electro-magnet, said circuit connection being arranged to supply an E. M. F. to the electro-magnet in a direction to maintain oscillations of the mass in the direction of the X axis, a damping electro-magnet, said damping electro-magnet being arranged to force an oscillation of the mass in the direction of the Y axis, a damping pick up having an output for the E. M. F. generated and arranged to be driven by oscillations of the mass in the direction of the Y axis, and an electric circuit connection between the output of the damping pick up and the input of the damping electro-magnet, said circuit connection being arranged to supply an E. M. F. to the damping electro-magnet in a direction to oppose oscillation of the mass in the direction of the Y axis.

5. A device for detecting turn or measuring rate of turn, the three dimensional orthogonal axes of which are designated X, Y, and Z, the turn taking place about the Z axis, and the X and Y axes therefore lying in the plane of the turn; said device comprising means resiliently mounted for movement in the direction of the X axis and the Y axis, means for forcing an oscillation in the X direction whereby a turn about the Z axis forces an oscillation of the mass in the Y direction, means for measuring the velocity of the oscillation of the mass in the Y direction, means for applying a force proportional to the said measured velocity to oppose and therefore to damp oscillations in the Y direction and means for detecting or measuring said applied force and thus obtaining a measure of the rate of turn.

6. A device for detecting turn or measuring rate of turn, the three dimensional orthogonal axes of which are designated X, Y, and Z, the turn taking place about the Z axis, and the X and Y axes therefore lying in the plane of the turn; said device comprising a mass resiliently mounted for vibratory movement in the directions of the X axis and of the Y axis, means for forcing an oscillation in the X direction, whereby a turn about the Z axis forces an oscillation of the mass in the Y direction, one or more electromagnets for applying a force to oppose and therefore damp oscillations in the Y direction, and means for detecting and measuring the force due to turn which causes such oscillation in the Y direction.

7. A device for detecting turn or measuring rate of turn, the three dimensional orthogonal axes of which are designated X, Y, and Z, the turn taking place about the Z axis, and the X and Y axes therefore lying in the plane of the turn; said device comprising a mass resiliently mounted for oscillatory movement at its natural frequency of vibration in the direction of the X axis, and at a substantially equal natural frequency in the direction of the Y axis, and means for forcing the mass to oscillate, said last named means comprising a main driving means applying a driving force at said natural frequency in the direction of the X axis, means for measuring the velocities of the oscillations in the Y direction, and a transverse driving means applying a force also at said natural frequency in the direction of the Y axis, said driving means being so constructed and arranged to cause the transverse drive to be in phase opposition with the said velocities in the direction of the Y axis in order to damp such velocities.

8. A device as set forth in claim 6 in which there is provided a pick-up driven by the oscillations of the mass in the direction of the Y axis to energize the electromagnets.

9. A device as set forth in claim 6 in which there is provided a pick-up driven by the oscillations of the mass in the direction of the Y axis to energize the electromagnets and also a pick-up driven by the oscillations of the mass in the X direction to generate a signal, an amplitude and phase adjusting means, and means for injecting the signal through said amplitude and phase adjusting means into the pick-up driven by the oscillations of the mass in the direction of the Y axis to cancel any false signal appearing when there is no turn.

10. A device for detecting turn or measuring rate of turn, the three dimensional orthogonal axes of which are designated X, Y, and Z, the turn taking place about the Z axis, and the X and Y axes therefore lying in the plane of the turn; said device comprising a mass mounted for movement in the direction of the X axis, means for forcing an oscillation of said mass in said direction, means for detecting or measuring the periodic force set up in the direction of the Y axis due to a component of turn about the Z axis, the mass being resiliently mounted and the means for forcing an oscillation of the mass comprising two driving electromagnets arranged to drive the mass at its natural frequency of oscillation in the direction of the X axis, and wherein the electromagnets are arranged one upon each side of the X axis, and means are provided for effecting a relative adjustment of the current supply to the two electromagnets to correct the direction of oscillation.

11. A device for measuring rate of turn, the three dimensional orthogonal axes of which are designated X, Y, and Z, the turn taking place about the Z axis, the X and Y axes therefore lying in the plane of the turn to be detected; said device comprising a base, a mass, said mass being mounted on the base for movement in the direction of the X axis and in the direction of the Y axis, means for forcing an oscillation of the mass in the direction of the X axis comprising electromagnetic means energised by both alternating and direct current to yield pulsating impulses of only one maximum per cycle, means controlled by oscillation of the mass in the direction of the Y axis for generating an alternating E. M. F. proportional to the velocities of the oscillations in the direction of the Y axis, and driving means controlled by said E. M. F. for applying a force to oppose and therefore to damp oscillations in the direction of the Y axis, said E. M. F. being a measure of the rate of turn.

FREDERICK WILLIAM MEREDITH.

REFERENCES CITED

The following references are of record in the file of this patent:

UNITED STATES PATENTS

| Number | Name | Date |
|---|---|---|
| Re. 22,409 | Lyman et al. | Dec. 21, 1943 |
| 2,178,259 | Forster | Oct. 31, 1939 |
| 2,249,649 | Fielding | July 15, 1941 |
| 2,277,037 | Clark et al. | Mar. 24, 1942 |
| 2,361,396 | Cross | Oct. 31, 1944 |